Dec. 25, 1956　　　D. L. PETTIT　　　2,775,728
ADJUSTABLE VOLTAGE DRIVE CONTROLLER
Filed Feb. 28, 1955
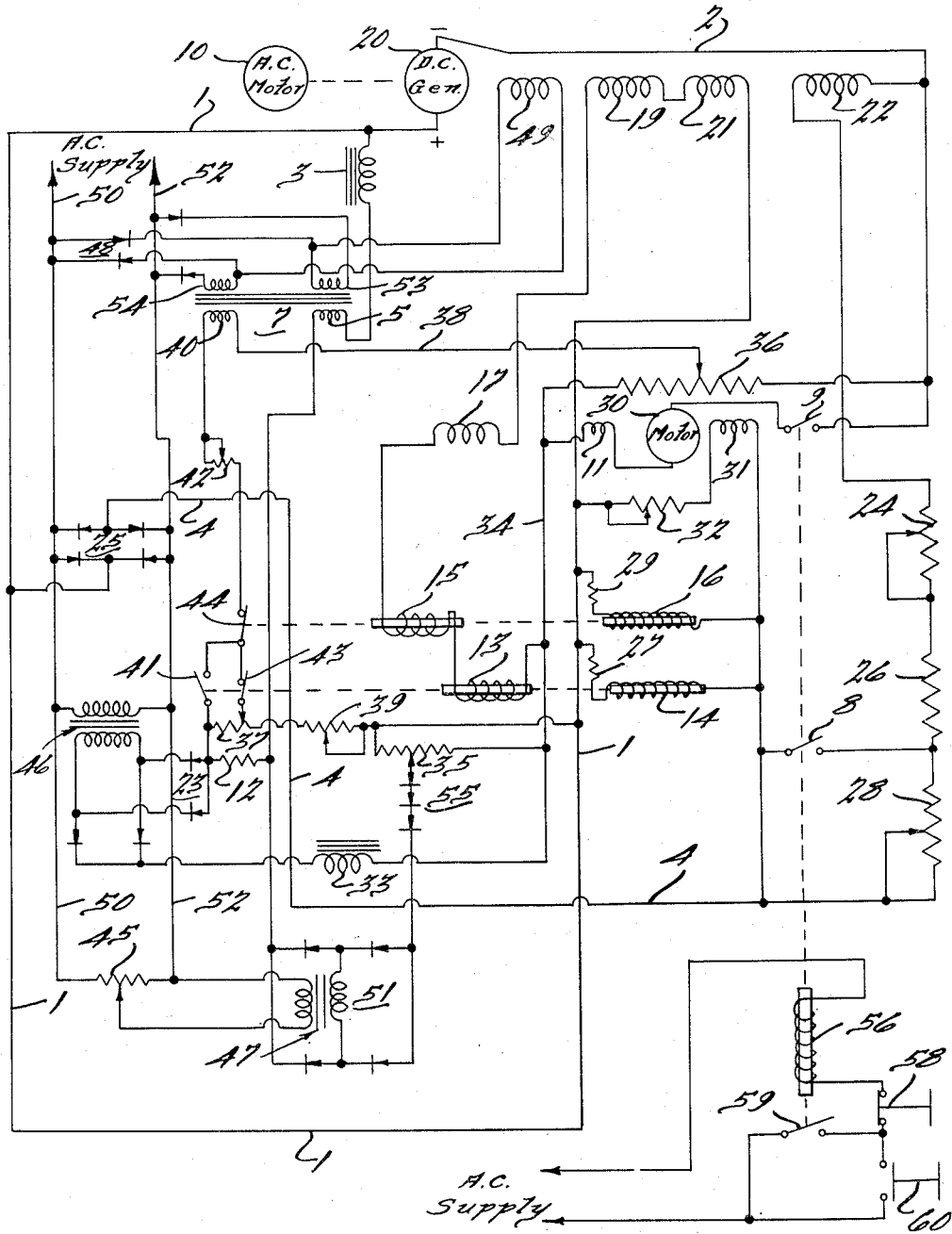
INVENTOR.
Dorn L. Pettit.
BY
ATTORNEY.

United States Patent Office 2,775,728
Patented Dec. 25, 1956

2,775,728

ADJUSTABLE VOLTAGE DRIVE CONTROLLER

Dorn L. Pettit, Wauwatosa, Wis., assignor to Square D Company, Detroit, Mich., a corporation of Michigan Application February 28, 1955, Serial No. 490,887

16 Claims. (Cl. 318—143)

This invention concerns a control system for a motor generator set which is utilized to drive a direct current motor. More specifically, it concerns a magnetic amplifier exciter control for a generator field which controls the output voltage of the generator and thereby the speed of a direct current motor fed by the generator.

It is the object of this invention to provide an exciter control system for a direct current generator having a main field winding and a supplementary field winding with means feeding the supplementary field winding by the difference between the generator output voltage and a reference voltage and with the supplementary field winding wound and connected to add to or subtract from the main field as the generator voltage is greater or less than the reference voltage.

It is a further object of this invention to provide an adjustable control system for a direct current generator utilizing a magnetic amplifier control for excitation of a main generator field, and a supplementary generator field operating to modify the characteristics of the system, by opposing the main generator field when the generator output voltage drops below a certain value and by adding to the main generator field when the generator output voltage is above a certain value.

It is a further object of this invention to provide a magnetic amplifier system for a direct current generator supplying a direct current motor including improved, reliable and simple means for limiting the value of current flowing in the motor-generator circuit during acceleration and deceleration of the motor by controlling the output of the magnetic amplifier.

Another object of the invention is to provide a magnetic amplifier exciter control system for a direct current generator supplying a direct current motor, having improved compensation for IR voltage drop including a tapered IR drop compensation in which more compensation is added at the high motor speed end and lesser compensation at lower motor speeds.

A further object of the invention is a control system in accordance with the preceding objects having simplified means for supplying the magnetic amplifier with a cut-off bias voltage and compensation for line voltage variations.

These and further objects and features of the invention will be readily apparent to those skilled in the art from the specification and appended drawing illustrating a certain preferred embodiment in which.

The figure is a diagrammatic representation of a control circuit incorporating the present invention.

In the figure, an alterntaing current motor 10 having conventional energizing circuits, not shown, is shown mechanically coupled to and driving a direct current generator 20 to provide a direct current output at lines 1 and 2. Line 2 connects the negative side of the generator 20 to a direct current motor armature 30 through normally open starting contacts 9. The motor armature 30 and its commutating field winding 11 are connected in series with a current limit decelerating relay coil 13, a current limit accelerating relay coil 15, series field winding 17 of motor 30, series field winding 19 and commutating field winding 21 of generator 20 to line 1 and the positive side of generator 20.

A supplementary, swinging field winding 22 for generator 20 is connected from line 2 through an adjustable rheostat 24, ballast resistor 26 and a parallel circuit formed by a residual adjusting rheostat 28 and normally open contacts 8 to a conductor 4. The circuit for the supplementary, swinging field winding 22 continues from conductor 4 through a rectifier stack 25 to line 1. The rectifier stack 25 is fed from the A. C. supply lines 50 and 52 and supplies a fixed voltage opposing the generator voltage applied to the swinging field winding 22. The winding 22 is wound on the generator field poles so as to add to the main generator field when the generator voltage exceeds the voltage supplied by rectifier 25 and, conversely, so as to oppose the main generator field when the generator voltage is less than that of rectifier 25.

From conductor 4, several parallel circuits are connected to line 1 as follows: a shunt field winding 31 for motor 30 through shunt field rheostat 32; a shunt coil 14 for the current limit decelerating relay through a ballast resistor 27; and a shunt coil 16 for the current limit accelerating relay through a ballast resistor 29.

A magnetic amplifier saturable reactor 7 controls the excitation of the generator 20. The main control winding at 40 is normally connected between a pair of voltage dividers, one end by the line 38 to the potentiometer 36 connected across the generator output and the other through a rheostat 42, normally closed contacts 43 and 44, speed control potentiometer 37 and minimum speed rheostat 39. The minimum speed rheostat is connected to line 1 while the speed control potentiometer 37 is connected to a rectifier stack 23 energized from a transformer 46 and supplying a reference voltage to which the generated voltage is compared to determine the energization of the main control winding 40. Speed control potentiometer 37 is shunted by a normally open contact 41 which, with normally closed contact 43, is controlled by the current limit deceleration relay. From the rectifier stack 23 the circuit for control winding 40 is completed through a filler choke 33 leading to conductor 34 connecting to one side of the generator supply.

The output windings of the magnetic amplifier 7 are shown at 53—54 supplying the main feld 49 of generator 20 through a conventional rectifier stack 48. The energization of the field 49 is, of course, determined by the output of the magnetic amplifier under control of the main control winding 40 and a supplementary control winding 5 to be now described.

The control winding 5 corrects the excitation of the generator 20 for the IR voltage drop and for alternating current line voltage variations. A bias on the control winding 5 is obtained by a voltage producing a current biasing the magnetic amplifier to cut off. This voltage is generated by a combination of transformer 47 and rectifier 51 and is controlled in magnitude by the setting of the potentiometer 45 in the primary of transformer 47.

IR voltage drop compensation is obtained from two basic elements, one of which is an amount proportional to current only and another which is proportional to both current and generated voltage. The signal is obtained by the voltage drop across the two generator fields 19 and 21, series motor field 17 and series current limit coils 15 and 13 on the accelerating and decelerating relays. One side of the control winding 5 is connected through a filter choke 3 to the line 1 and the other side of the winding 5 is connected through bias rectifier 51, rectifier cells 55 and a potentiometer 35 to the opposite side of the voltage drop at conductor 34. The magnitude of the signal voltage is controlled by the potentiometer 35. On current increase, the voltage drop between line 1 and conductor 34 increases, causing a current change in the control winding 5 of the magnetic amplifier 7 in a direction to increase the excitation of generator 20.

The start and stop circuit for the motor 30 is connected across a convenient source of alternating current supply and has a starting relay coil 56 in series with a normally closed stop button 58 and a normally open start button 60. The starting relay controls contacts 8 and 9 and has an interlock contact 59 which closes to form a holding circuit about the start button 60.

The operation of the device is as follows:

With motor 10 driving generator 20, the motor 30 is connected to a generator output by pressing the start button 60 to energize starting relay coil 56 and close contacts 8, 9 and 59. The closure of contact 9 completes a circuit from the negative side of the generator 20 to the negative side of the motor 30 through line 2 and the closing of contact 8 shorts out the residual controlling rheostat 28.

The setting of potentiometer 37 establishes the speed of rotation of the motor 30 which is to be controlled. The voltage across potentiometer 37, which is supplied in the main from the rectifier 23, is compared to the voltage across potentiometer 36 which is supplied from the generated voltage. Excitation of the field 49 of the generator 20 will be controlled until the current in winding 40 approaches zero as the network voltages which are compared become similar, the magnetic amplifier cutting off under the bias provided by the voltage generated by the combination of the transformer 47 and rectifier stack 51.

Current limit for acceleration and deceleration of the motor 30 is obtained through the use of the series coils 15 and 13 respectively. If accelerating current is excessive, the current through coil 15 is sufficient to open contacts 44, thereby opening the circuit to control winding 40 and permitting the magnetic amplifier to be biased to cut off momentarily from the voltage generated in the transformer 47 and rectifier stack 51. As soon as the current level reaches that value which permits the contacts 44 to reclose, the control winding 40 is re-established in the circuit permitting the motor armature current to again rise. The contacts 44 thereby vibrate open and closed until the speed of motor 30 has reached a value at which the armature current has subsided to a level which does not cause the contacts 44 to open.

The series coil 13 operates similarly on deceleration except that it controls both the normally open contact 41 and the closed contact 43. The opening of contact 43 disconnects the control winding 40 from the comparison network and the closing of contact 41 connects it to the full "on" or high speed connection to the voltage reference 23, thus causing a reduction of decelerating current. The contacts 41 and 43 continue to vibrate closed and open respectively until the speed of motor 30 decreases to a value where the current no longer causes the contacts to operate.

As previously explained, the main IR voltage compensation is obtained from the signal voltage across the two generator fields 19, 21, the motor series field 17, the current limit accelerating coil 15 and current limit decelerating coil 13. As this signal voltage increases with current increase, control winding 5 changes the excitation of magnetic amplifier 7 in a direction to increase the output of windings 53, 54 to the generator field 49. Since both the magnetic amplifier 7 and excitation characteristics of the generator 20 are non-linear, requiring additional driving voltage as they reach the higher voltage end of their operation, a tapered portion of this IR compensation is desirable. This is obtained by adding IR compensation voltage to reference 23 voltage, giving the effect of an increased reference for compensation at increased currents. In the system illustrated in the figure, it will be observed that the control potentiometer 37 divides the IR compensation voltage portion as well as the basic reference voltage. This has the effect of an increased reference voltage at the high speed end to provide for more IR drop compensation; the amount of this tapering effect being determined by controlling the magnitude of the IR compensation as compared to the reference voltage.

Compensation for line voltage variation is obtained by utilizing the non-linear characteristics of the series rectifier cells 55. The number of cells is chosen such that small changes in the alternating current supply line voltage reflected through the bias system from transformer 47 and rectifier 51 make proportionately larger changes in the amount of bias current. In this way when low voltage line conditions are involved, the bias current is reduced sufficiently to compensate in the magnetic amplifier and stabilizes the response of the controller.

The supplementary, swinging generator field 22 is employed to obtain generated voltages less than could otherwise be obtained by the lowest value of winding 49 field current which is obtainable from the magnetic amplifier 7. This supplementary winding 22, when the generator voltage is less than rectifier 25 voltage, subtracts from the main generator field in an amount to obtain the lowest desired speed for the motor. If the swinging or bucking field is sufficiently strong, actual reversal of the motor may be obtained. Conversely, the field from the winding 22 adds to the main generator field when the generator voltage is above that supplied by the rectified stack 25. Hence, this supplementary field is termed a swinging field since it adds at the higher motor speeds and subtracts at lower speeds.

This swinging field permits a reduction in the size of the magnetic amplifier necessary for the generator field because for the high end of the operating range the generator becomes partially self-excited. Also, because the magnetic amplifier controls only part of the generator field, response is slower, thus limiting accelerating currents and avoiding instability and hunting in the response characteristic of the drive. The use of the swinging field also provides desirable simplicity in the construction of the generator field structure to facilitate manufacture and simplicity of connections.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In an exciter control system for a direct current generator, a main generator field winding, means controlling the excitation of said main generator field winding, a supplementary generator field winding, means supplying a reference voltage, and means energizing the supplementary field winding by the difference between the generator output voltage and the reference voltage, said supplementary winding being wound and connected to add to the main field when the generator voltage exceeds the reference voltage and to subtract from the main field when the reference voltage exceeds the generator voltage.

2. In an exciter control system for a direct current generator supplying a direct current motor, a main generator field winding, means controlling the excitation of said main field winding to control the generator output and the speed of the motor fed thereby, a supplementary generator field winding, and means energizing the supplementary field winding in a direction and at a value dependent upon the generator output voltage, said supplementary winding being wound and connected to add to the main field when the generator voltage exceeds a predetermined value and to subtract from the main field when the generator voltage is less than said predetermined value.

3. In an exciter control system for a direct current generator supplying a direct current motor, a main generator field winding, means controlling the excitation of said main field winding to control the generator output and the speed of the motor fed thereby, said control means being responsive to the value of the generator output, means for varying the value of the output to which the control means is responsive to vary the adjusted motor speed, a supplementary generator field winding, and means energizing the supplementary field winding in a direction and at a value dependent upon the generator output voltage, said supplementary winding being wound and connected to add to the main field when the generator voltage exceeds a predetermined value and to subtract from the main field when the generator voltage is less than said predetermined value.

4. In an exciter control system for a direct current generator supplying a direct current motor, a main generator field winding, means for adjustably energizing said main field winding, a supplementary generator field winding, means supplying a direct current reference voltage, means opposing said direct current voltage with the output voltage of the generator and feeding said supplementary field winding with the difference between said voltages, said supplementary winding being wound and connected to add to the main field when the generator voltage exceeds the reference voltage and to subtract from the main field when the reference voltage exceeds the generator voltage.

5. In a magnetic amplifier exciter control system for a direct current generator supplying a direct current motor, a main generator field winding, a magnetic amplifier having output and control windings, means supplying said main field winding from the output windings of said magnetic amplifier, means supplying the control winding of the magnetic amplifier with a signal voltage indicative of the speed of the motor to control the generator excitation, a supplementary generator field winding, means supplying a direct current reference voltage, means energizing the supplementary field winding by the difference between the generator output voltage and the reference voltage, said supplementary winding being wound and connected to add to the main field when the generator voltage exceeds the reference voltage and to subtract from the main field when the reference voltage exceeds the generator voltage.

6. In a magnetic amplifier exciter control system for a direct current generator supplying a direct current motor, a main generator field winding, a magnetic amplifier having output and control windings, means supplying said main field winding from the output windings of said magnetic amplifier, means establishing a first reference voltage, means establishing a voltage proportional to the generator output, means for comparing said voltages and supplying the resultant as a control signal to the control winding of the magnetic amplifier, a supplementary generator field winding, means supplying a second reference voltage, and means energizing the supplementary field winding by the difference between the second reference voltage and said generator voltage, said supplementary winding being wound and connected to add or subtract to the main field as the generator voltage is greater or less than said second reference voltage.

7. In a magnetic amplifier exciter control system for a direct current generator supplying a direct current motor, a main generator field winding, a magnetic amplifier having output and control windings, means supplying said main field winding from the output windings of said magnetic amplifier, means supplying a control signal voltage to the control winding of the magnetic amplifier, current limit accelerating and decelerating relays having operating coils in series with the motor-generator circuit, the current limit accelerating relay operating upon excess current to open the circuit to the control winding of the magnetic amplifier and the current limit decelerating relay operating upon excess current to connect the control winding to a high voltage signal.

8. In a magnetic amplifier exciter control system for a direct current generator supplying a direct current motor, a main generator field winding, a magnetic amplifier having output and control windings, means supplying said main field winding from the output windings of said magnetic amplifier, means supplying a reference voltage, means supplying a voltage indicative of motor speed, means comparing said last mentioned voltage and the reference voltage to obtain a signal voltage indicative of the variation of the motor speed from a desired value, means for feeding said signal voltage to the control winding of the magnetic amplifier to vary the generator excitation to control the motor speed, current limit acceleration and deceleration relays having operating relays in series with the motor-generator circuit, the current limit accelerating relay operating upon excess current to open the circuit to the control winding of the magnetic amplifier, the current limit decelerating relay operating on excess current to disconnect the control winding from the normal comparison network and connect it to a higher value of the reference voltage.

9. In a magnetic amplifier exciter control system for a direct current generator supplying a direct current motor, a main generator field winding, a magnetic amplifier having output and control windings, means supplying said main field winding from the output windings of said magnetic amplifier, means supplying the control winding of the magnetic amplifier with a signal voltage indicative of the speed of the motor to vary the generator excitation to control the motor speed, means providing a second energizing signal to the magnetic amplifier proportionate to the current flowing in the motor-generator circuit to partially compensate for the IR voltage drop therein, and means supplying a third energizing control signal to said magnetic amplifier varying with the motor speed to further compensate for the IR voltage drop in the motor-generator circuit.

10. In a magnetic amplifier exciter control system for a direct current generator supplying a direct current motor, a main generator field winding, a magnetic amplifier having output and control windings, means supplying said main field winding from the output windings of said magnetic amplifier, means supplying a reference voltage, means supplying a voltage proportional to the generator voltage, means comparing said latter voltage to said reference voltage to supply a signal voltage energizing the control winding of the magnetic amplifier to vary the generator excitation to control the motor speed, a second control winding for the magnetic amplifier, means energizing said second control winding with a second signal voltage proportional to the current in the motor-generator circuit to partially compensate for the IR voltage drop therein, and means for adding a voltage proportional to the second signal voltage to increase the IR voltage drop compensation.

11. In a magnetic amplifier exciter control system for a direct current generator supplying a direct current motor, a main generator field winding, a magnetic amplifier having output and control windings, means supplying said main field winding from the output windings of said magnetic amplifier, means supplying a reference voltage, means supplying a voltage proportional to the generator voltage, means comparing said latter voltage to said reference voltage to supply a signal voltage energizing the control winding of the magnetic amplifier to vary the generator excitation to control the motor speed, a second control winding for the magnetic amplifier, means energizing said second control winding with a second signal voltage proportional to the current in the motor-generator circuit to partially compensate for the IR voltage drop therein, means for adding a voltage proportional to the second signal voltage to said reference voltage whereby to increase said first signal voltage to increase the IR voltage drop compensation, said means for comparing said reference voltage and the voltage proportional to generator output including regulatory means for varying the motor speed as desired, and means whereby said regulatory means varies the IR voltage drop compensation added to said first signal voltage to provide for the addition of greater IR compensation at higher motor speeds, whereby a tapering of the IR compensation over the motor speed range is effected.

12. In a magnetic amplifier exciter control system for a direct current generator supplying a direct current motor, a main generator field winding, a magnetic amplifier having output and control windings, means supplying said main field winding from the output windings of said magnetic amplifier, means supplying a first control winding of the magnetic amplifier with a signal voltage indicative of the speed of the motor to vary the generator excitation and control the motor speed, means supplying a bias voltage to a second control winding of the magnetic amplifier to insure cut-off of the magnetic amplifier as the signal voltage approaches zero, means supplying a second signal voltage to said second control winding proportional to the current in the motor-generator circuit to compensate for IR voltage drop therein, and rectifier means in series with said bias voltage circuit compensating for voltage changes in the supply for the system.

13. In a magnetic amplifier exciter control system for a direct current generator supplying a direct current motor, a main generator field winding, a magnetic amplifier having output and control windings, means supplying said main field winding from the output windings of said magnetic amplifier, means supplying a first control winding of the magnetic amplifier with a signal voltage indicative of the speed of the motor to vary the generator excitation to control the motor speed, a rectifier circuit fed from the same supply as said magnetic amplifier output and establishing a bias voltage, a second control winding for said magnetic amplifier fed by said bias voltage to establish a cut-off point when the signal voltage approaches zero value, and series connected rectifier means in said rectifier circuit operating to magnify changes in the bias current supplied by the rectifier circuit caused by fluctuations in the line voltage of the supply.

14. In a magnetic amplifier exciter control system for a direct current generator supplying a direct current motor, a main generator field winding, a magnetic amplifier having output and control windings, means supplying said main field winding from the output windings of said magnetic amplifier, means supplying a first control winding of the magnetic amplifier with a signal voltage indicative of the speed of the motor to vary the generator excitation to control the motor speed, a rectifier circuit fed from the same supply as said magnetic amplifier output and establishing a bias voltage, a second control winding for said magnetic amplifier fed by said bias voltage to establish a cut-off point when the signal voltage approaches zero value, series connected rectifier means in said rectifier circuit operating to magnify changes in the bias current supplied by the rectifier circuit caused by fluctuations in the line voltage of the supply, means supplying a second signal voltage to said second control winding of the magnetic amplifier proportional to the current flowing in the motor-generator circuit to partially compensate for IR voltage drop in the circuit, and means increasing said first signal voltage by a value proportional to the current flowing in the motor-generator circuit to further compensate for the IR voltage drop in the circuit.

15. In a magnetic amplifier exciter control system for a direct current generator supplying a direct current motor, a main generator field winding, a magnetic amplifier having output and control windings, means supplying said main field winding from the output windings of said magnetic amplifier, means supplying a reference voltage, means supplying a voltage proportional to the generator voltage, means comparing said latter voltage to said reference voltage to supply a signal voltage energizing a first control winding of the magnetic amplifier to vary the generator excitation to control the motor speed, means energizing a second control winding of the magnetic amplifier with a second signal voltage proportional to the current in the motor-generator circuit to partially compensate for the IR voltage drop therein, means for adding a voltage proportional to the second signal voltage to said reference voltage whereby to increase said first signal voltage to increase the IR voltage drop compensation, said means for comparing said reference voltage and the voltage proportional to generator output including regulatory means for varying the motor speed as desired, means whereby said regulatory means varies the IR voltage drop compensation added to said first signal voltage to provide for the addition of greater IR compensation at higher motor speeds, whereby a tapering of the IR compensation over the motor speed range is effected, a supplementary generator field winding, means supplying a second reference voltage, and means energizing the supplementary field winding by the difference between the generator output voltage and the reference voltage, said supplementary winding being wound and connected to add to the main field when the generator voltage exceeds the second reference voltage and to subtract from the main field when the second reference voltage exceeds the generator voltage.

16. In a magnetic amplifier exciter control system for a direct current generator supplying a direct current motor, a main generator field winding, a magnetic amplifier having output and control windings, means supplying said main field winding from the output windings of said magnetic amplifier, means supplying a first control winding of the magnetic amplifier with a signal voltage indicative of the speed of the motor to vary the generator excitation to control the motor speed, a rectifier circuit fed from the same supply as said magnetic amplifier output and establishing a bias voltage, a second control winding for said magnetic amplifier fed by said bias voltage, a second control winding for said magnetic amplifier fed by said bias voltage to establish a cut-off point when the signal voltage approaches zero value, series connected rectifier means in said rectifier circuit operating to magnify changes in the bias current supplied by the rectifier circuit caused by fluctuations in the line voltage of the supply, means supplying a second signal voltage to said second control winding of the magnetic amplifier proportional to the current flowing in the motor-generator-circuit to partially compensate for IR voltage drop in the circuit, means increasing said first signal voltage by a value proportional to the current flowing in the motor-generator circuit to further compensate for the IR voltage drop in the circuit, a supplementary generator field winding, means supplying a reference voltage, and means energizing the supplementary field winding by the difference between the generator output voltage and the reference voltage, said supplementary winding being wound and connected to add to the main field when the generator voltage exceeds the reference voltage and to subtract from the main field when the reference voltage exceeds the generator voltage.

References Cited in the file of this patent
UNITED STATES PATENTS 2,600,308    Lund et al. _____ June 10, 1952